(12) United States Patent
Huang

(10) Patent No.: US 7,284,797 B2
(45) Date of Patent: Oct. 23, 2007

(54) BACKREST ADJUSTMENT STRUCTURE FOR BABY STROLLER

(76) Inventor: Mien Chen Huang, 123-2, Pitou, Kuanmiao, Tainan (TW)

( * ) Notice: Subject to any disclaimer, the term of this patent is extended or adjusted under 35 U.S.C. 154(b) by 351 days.

(21) Appl. No.: 11/092,449

(22) Filed: Mar. 28, 2005

(65) Prior Publication Data
US 2006/0214490 A1 Sep. 28, 2006

(51) Int. Cl.
*B60N 2/00* (2006.01)
*A44B 17/00* (2006.01)
(52) U.S. Cl. .............................. 297/354.12; 297/354.1; 24/170
(58) Field of Classification Search .................. 24/170, 24/134 P, 132 WL; 297/354.12, 354.1, 380, 297/284.5; 280/47.4
See application file for complete search history.

(56) References Cited

U.S. PATENT DOCUMENTS

| | | | | | |
|---|---|---|---|---|---|
| 2,882,903 | A | * | 4/1959 | Ramien | 606/203 |
| 4,387,489 | A | * | 6/1983 | Dudek | 24/133 |
| 5,661,877 | A | * | 9/1997 | Bloomer | 24/170 |
| 5,852,853 | A | * | 12/1998 | Pennoyer, Jr. | 24/134 P |
| 5,920,963 | A | * | 7/1999 | Chou | 24/170 |
| 6,212,740 | B1 | * | 4/2001 | Yang et al. | 24/170 |
| 6,471,222 | B1 | * | 10/2002 | Hsia | 280/47.4 |
| 6,543,096 | B2 | * | 4/2003 | Settelmayer et al. | 24/170 |
| 6,908,100 | B2 | * | 6/2005 | Kassai et al. | 280/642 |
| 6,938,914 | B2 | * | 9/2005 | Kassai et al. | 280/642 |
| 2003/0052474 | A1 | * | 3/2003 | Yang et al. | 280/642 |
| 2004/0148743 | A1 | * | 8/2004 | Brunt | 24/132 WL |
| 2004/0187271 | A1 | * | 9/2004 | Mikkelsen | 24/170 |

\* cited by examiner

*Primary Examiner*—David Dunn
*Assistant Examiner*—Tania Abraham
(74) *Attorney, Agent, or Firm*—Pro-Techtor Int'l Services

(57) ABSTRACT

A backrest adjustment structure for adjusting the reclined position of the backrest of the seat of a baby stroller is disclosed to include a belt connected between the ends of the handlebar of the baby stroller at the back side of the backrest of the seat, a housing coupled to two equal belt sections of the belt at the back side of the backrest of the seat of the baby stroller, and two retaining blocks pivotally mounted on a pivot member inside the housing at two sides of the belt and turnable about the pivot member between a first position to hold down the two belt sections of the belt and a second position to release the belt sections of the belt. The two retaining blocks are forced by the two reversely extending ends of the belt sections of the belt to hold down the two belt sections with respective teeth thereof and to support the backrest of the seat in the desired reclined position.

5 Claims, 7 Drawing Sheets

US 7,284,797 B2

BACKREST ADJUSTMENT STRUCTURE FOR BABY STROLLER

BACKGROUND OF THE INVENTION

1. Field of the Invention:

The present invention relates to a baby stroller and more particularly, to a backrest adjustment structure for use in a baby stroller for adjusting the angle of inclination of the backrest of the seat of the baby stroller.

2. Description of the Related Art:

FIG. 1 shows a conventional baby stroller. According to this design, the seat 10 of the baby stroller has a backrest 20. The backrest 20 can be adjusted to one of a limited number of (two or three) reclined positions. As illustrated, two adjustment rods 40 are respectively pivotally connected to two opposite lateral sides of the backrest 20, each having a plurality of longitudinally spaced bottom locating notches 401 that are selectively connectable to a respective locating rod 301 at the handlebar 30 of the baby stroller. U.S. Pat. No. 5,454,584 discloses a similar design. This design does not allow the user to freely adjust the angle of inclination of the backrest 20 of the seat 10.

Further, stepless backrest adjustment designs for baby stroller are seen in U.S. Pat. No. 6,471,222, and U.S. Publication No. 2003/0052474. U.S. Pat. No. 6,471,222 discloses an adjustable seat back arrangement for stroller, which includes two elongated elements extended from two construction bars to a rear side of a back support, an inclination locker securely locked up the two elongated elements together for adjusting lengths of the elongated elements between the construction bars and the inclination locker so as to adjust an inclined angle of the back support with respect to a seat support. This design has a cheap value image in the market. Further, the design of U.S. Publication No. 2003/0052474 uses a big number of component parts. This complicated design is inconvenient to install. Further, the spring member used in this design wears quickly with use.

SUMMARY OF THE INVENTION

The present invention has been accomplished under the circumstances in view. It is one object of the present invention to provide a backrest adjustment structure for baby stroller, which is inexpensive to manufacture and easy to assemble. It is another object of the present invention to provide a backrest adjustment structure for baby stroller, which eliminates the use of any spring means. To achieve these and other objects of the present invention, the backrest adjustment structure comprises a housing, a pivot member, two retaining blocks, and a belt. The housing has a top opening and a bottom hole. The pivot member is transversely mounted inside the housing. The two retaining blocks are respectively pivotally mounted on the pivot member at two sides inside the housing, each comprising a base pivoted to the pivot member, a finger strip extending from the top side of the base to the outside of the housing through the top opening of the housing, and a plurality of transverse teeth arranged in parallel at the base near the bottom side of the base. The belt has two belt sections arranged together and inserted through the bottom hole and top opening of the housing between the two retaining blocks, each belt section having a first end connected to each other below the bottom hole of the housing and a second end extending outwards in reversed directions outside the housing and respectively fastened to the two distal ends of the handlebar of a baby stroller. The reversely extended second ends of the two belt sections of the belt impart a pressure to turn the retaining blocks about the pivot bolt and to further force the retaining blocks to hold down the two belt sections of the belt with the respective transverse teeth. The retaining blocks are forced to disengage the respective transverse teeth from the two belt sections of the belt for enabling the user to adjust the position of housing relative to the belt when the user pressed the finger strips of the retaining blocks toward each other.

DETAILED DESCRIPTION OF THE PREFERRED EMBODIMENT

Figure 1:
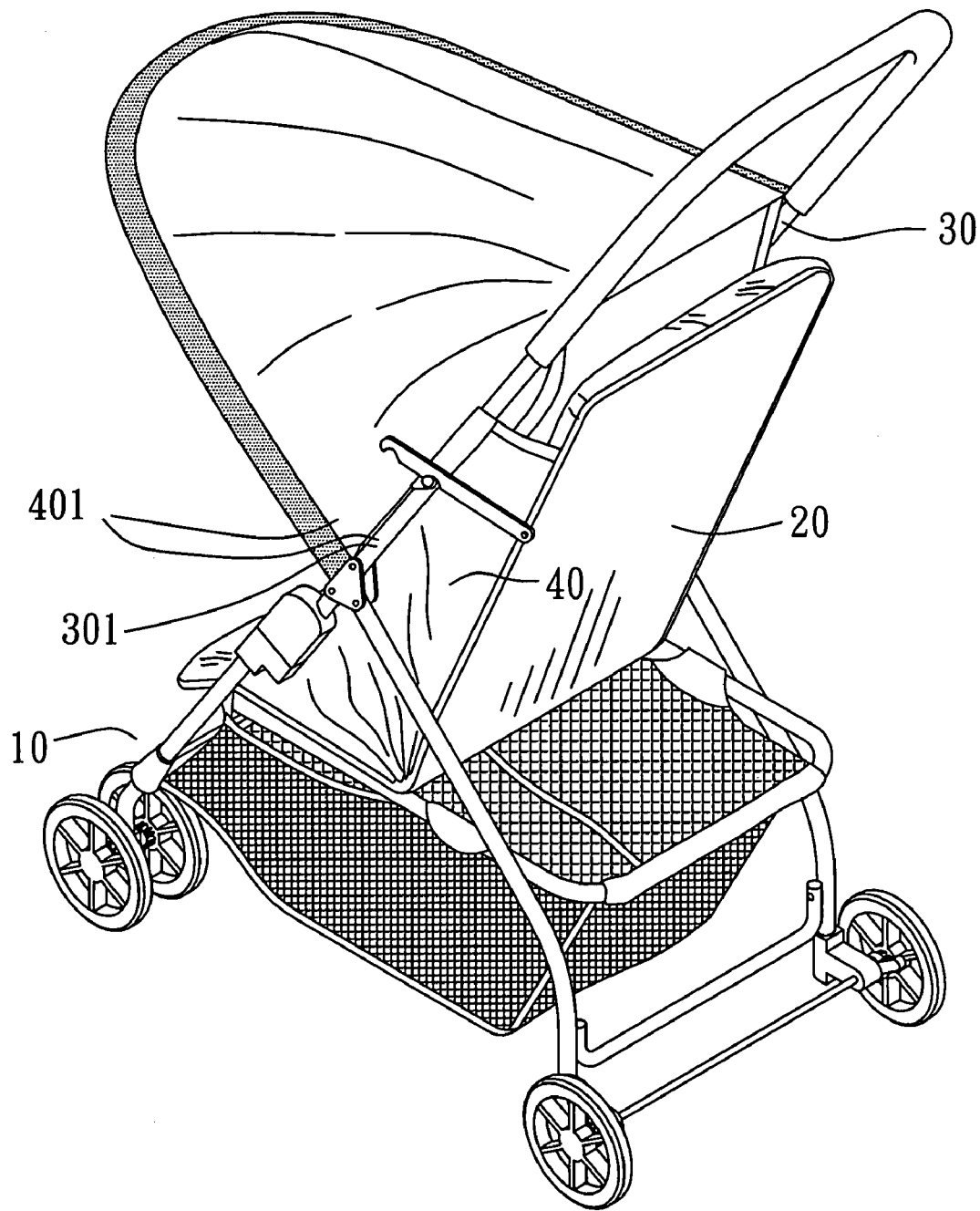
FIG. 1 is a perspective view of a baby stroller constructed according to the prior art.
Figure 2:
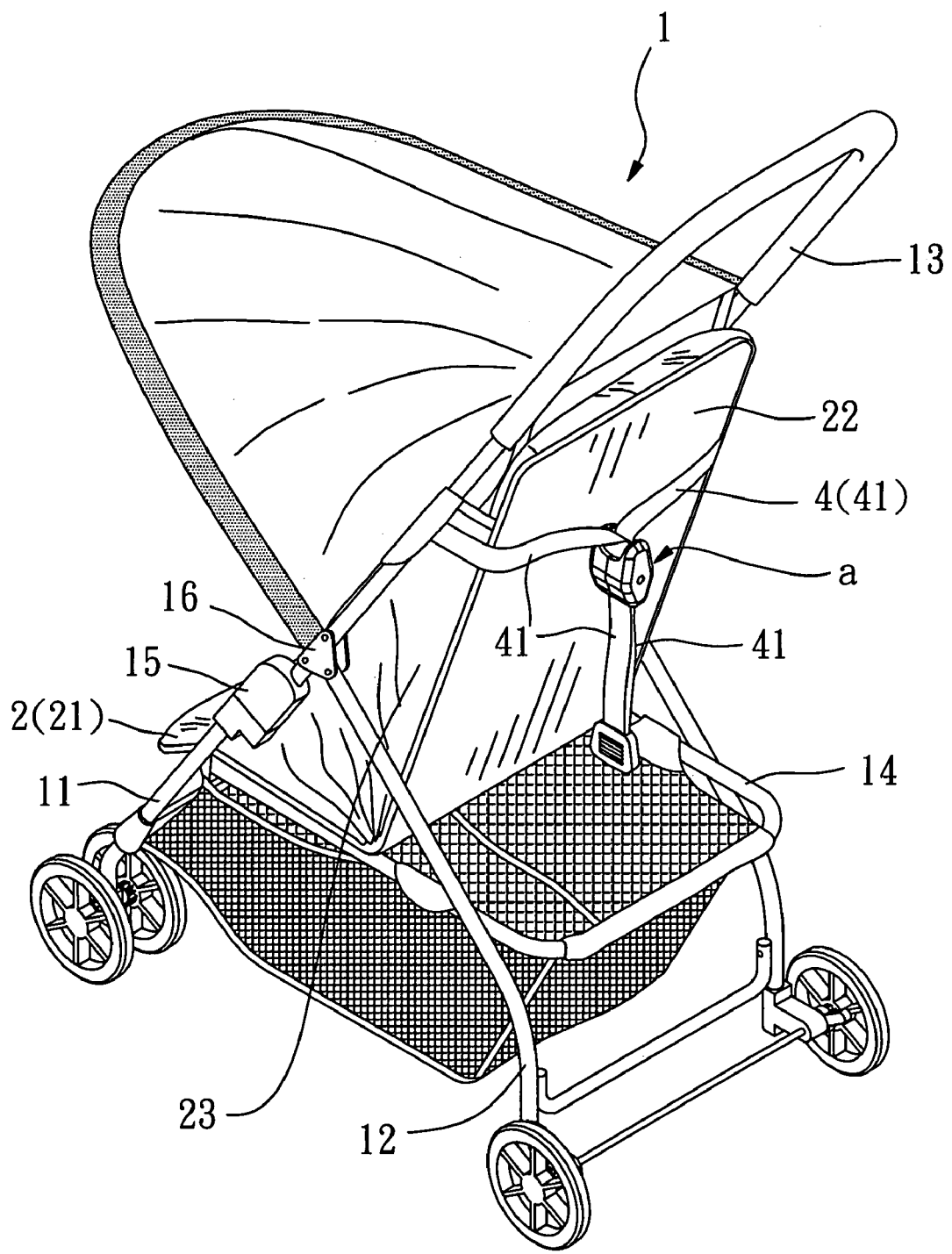
FIG. 2 is a perspective view of a baby stroller constructed according to the present invention.

Referring to FIG. 2, a baby stroller in accordance with the present invention is shown comprised of front and rear legs 11, 12, a handlebar 13, and a seat frame tube 14. Each front leg 11 has the top end thereof pivotally connected to one end of the handlebar 13 with a joint 15. Each rear leg 12 has the top end thereof pivotally connected to a lug 16 at one end of the handlebar 13 adjacent to the respective joint 15. The seat frame tube 14 holds a seat member 2. The seat member 2 comprises a seat body 21, a backrest 22, and two side wings 23. Each side wing 23 has a front bottom side fixedly connected to the seat body 21, a rear side fixedly connected to the backrest 22, and a front top side fastened to the handlebar 13.

Figure 3:
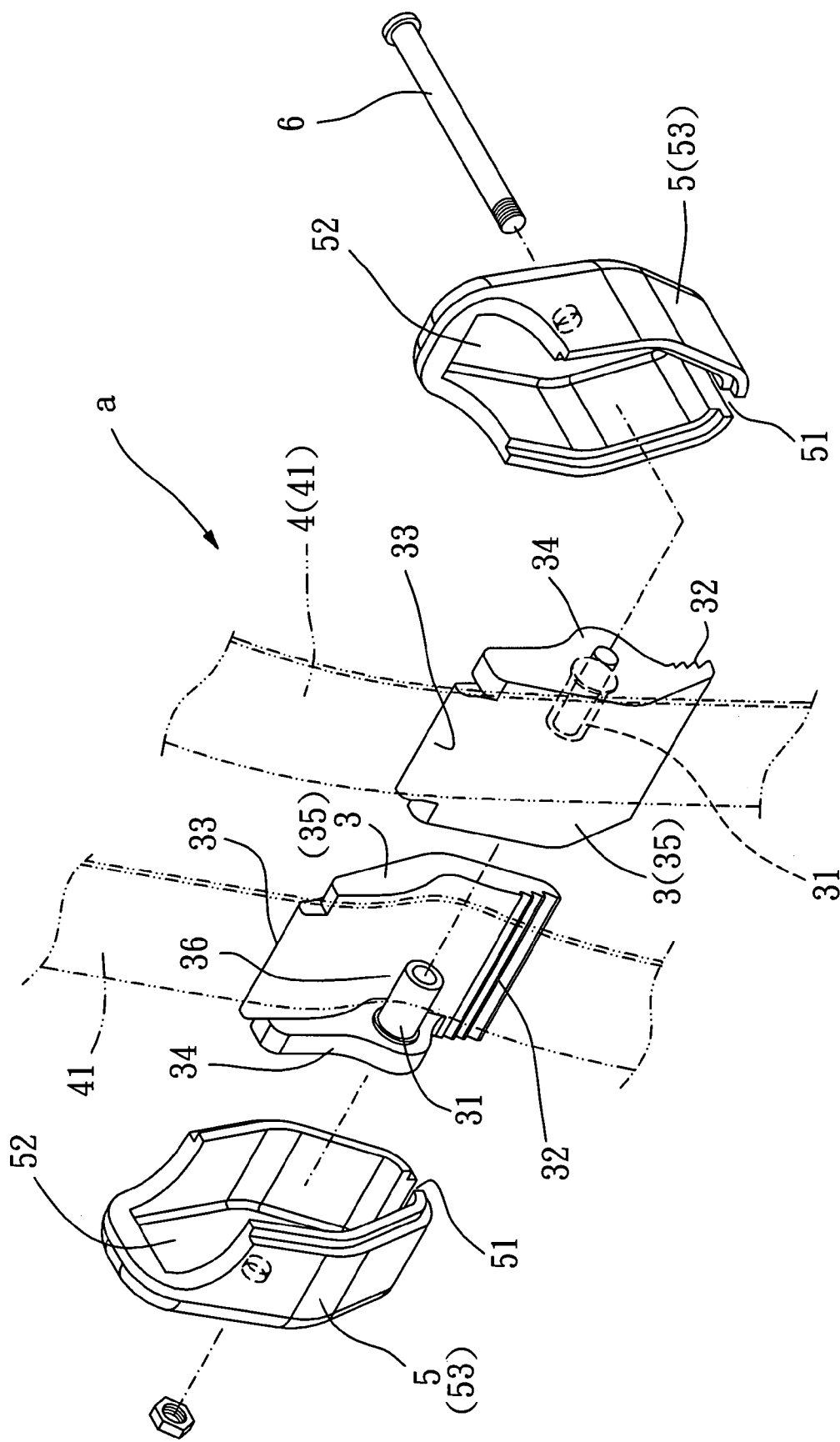
FIG. 3 is an exploded view of a backrest adjustment structure for baby stroller according to the present invention.
Figure 4:
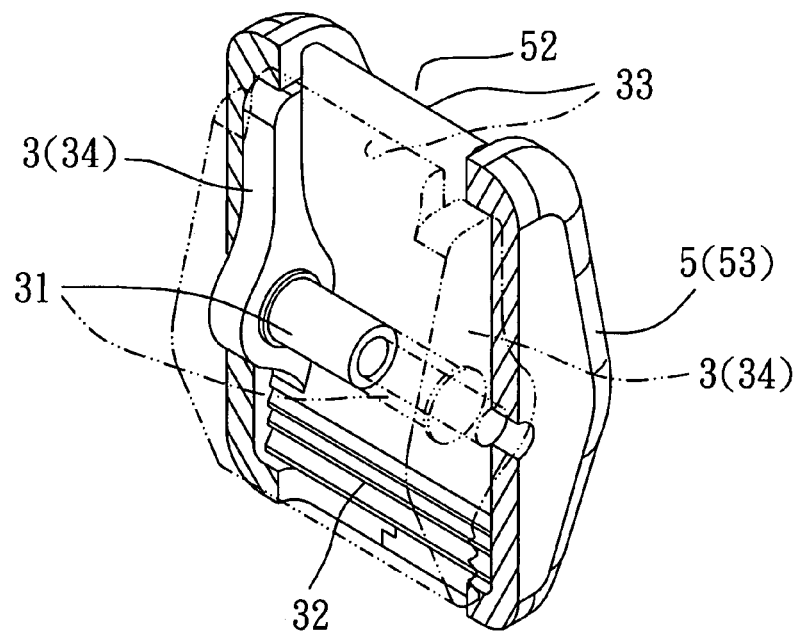
FIG. 4 is a sectional assembly view of the backrest adjustment structure for baby stroller according to the present invention (the belt excluded).
Figure 5:
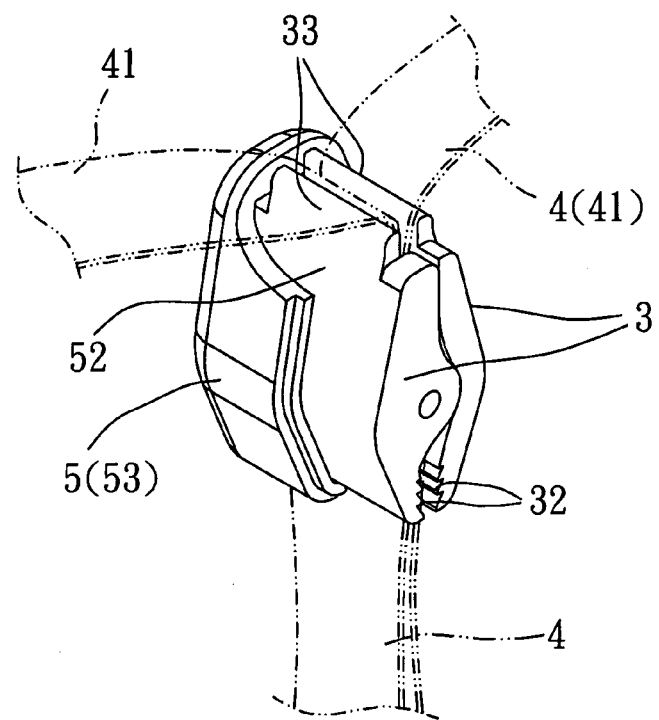
FIG. 5 is an elevational view of a part of the backrest adjustment structure for baby stroller according to the present invention.
Figure 6:
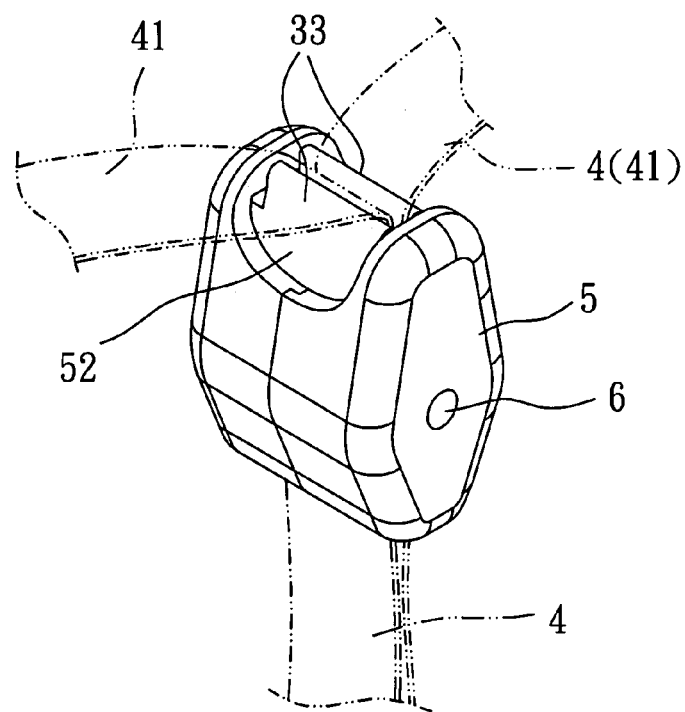
FIG. 6 is an elevational view of the backrest adjustment structure for baby stroller according to the present invention.

Referring to FIG. 3, a backrest adjustment structure "a" is shown comprised of two retaining blocks 3, a belt 4 having two belt sections 41, a housing 5, and a fastening member 6.

The retaining blocks 3 each comprise a base 35, a sidewall 34 perpendicularly extended from one lateral side of the base 33, a plurality of transverse teeth 32 arranged in parallel on a lower portion of the base 35 at an inner side, a barrel 31 perpendicularly extending from the sidewall 34 at an elevation above the transverse teeth 32 and spaced from the base 33 at a distance 36, and a finger strip 33 formed integral with the top side of the base 35. The base 35 is a flat member having a substantially v-shaped cross section, and the outwardly curved middle part of the base 35 is set corresponding to the barrel 31.

The belt is divided into two equal belt sections 41 (see FIG. 2), each having one end formed integral with each other and the other end vertically inserted through the gap 36 in one retaining block 3 between the barrel 31 and the base 35 over the transverse teeth 32 (see FIG. 3). Referring to FIGS. 3 through 6, the housing 5, comprised of two equal half shells 53 abutted against each other, holds the two retaining blocks 3 on the inside, keeping the barrels 31 of the two retaining blocks 3 connected in a line and the two belt sections 41 of the belt 4 extending through the gaps 36 in the retaining blocks 3, having a bottom hole 51 for the passing of the two belt sections 41 of the belt 4 and a top opening 52 through which the finger strips 33 of the retaining blocks 3 extend to the outside of the housing 5.

The fastening member 6 can be a pivot pin or bolt that is inserted through the two half shells 53 and the barrels 31 of the retaining blocks 3 to secure the retaining blocks 3 and the housing 5 together.

Figure 7:
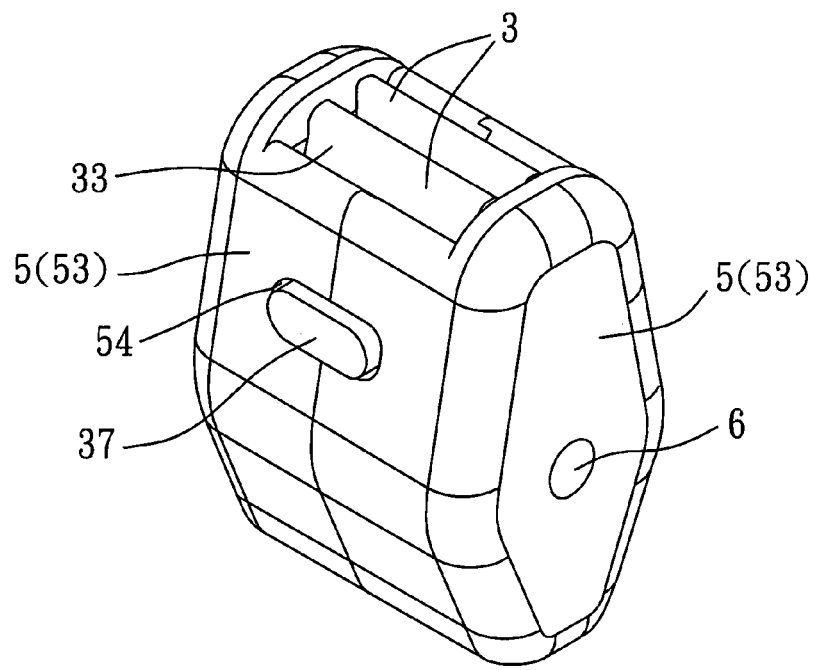
FIG. 7 is an elevational view of an alternate form of the backrest adjustment structure for baby stroller according to the present invention.

Referring to FIG. 7, the retaining blocks 3 each further comprise a fixed key 37 at an outer side, and the housing 5 comprises two button holes 54 symmetrically disposed at two sides for accommodating the fixed keys 37 of the retaining blocks 3.

Figure 8:
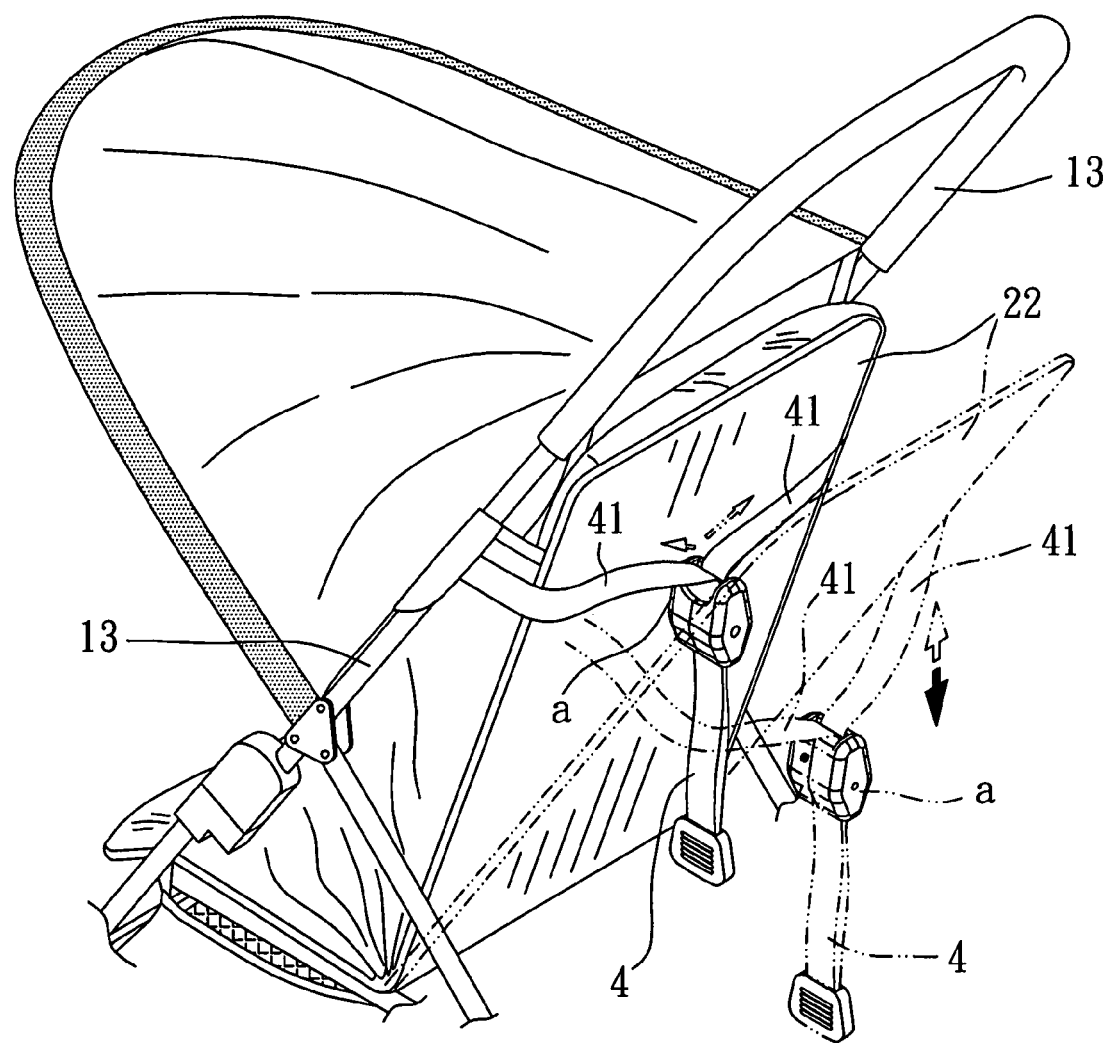
FIG. 8 is a schematic view showing the adjustment operation of the backrest adjustment structure according to the present invention.
Figure 9:
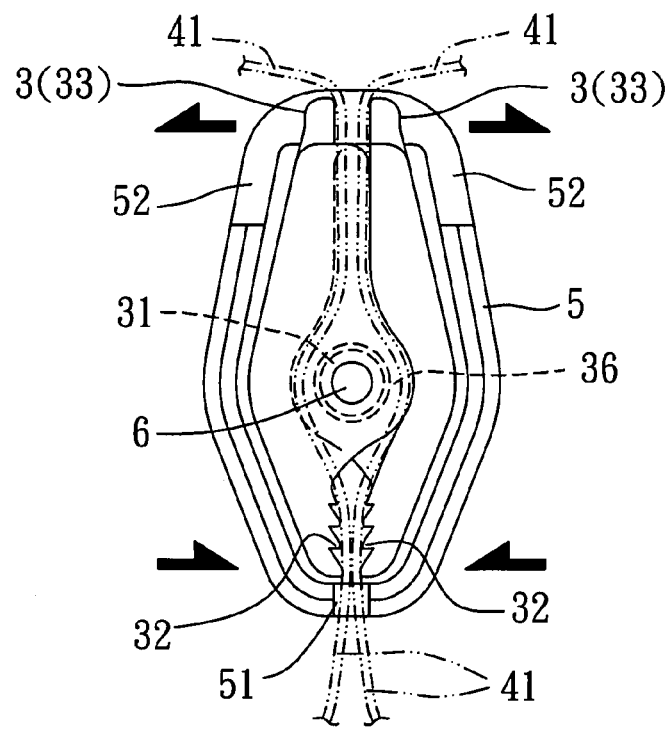
FIG. 9 is a schematic sectional view showing the transverse teeth of the retaining blocks pressed on the two belt sections of the belt according to the present invention.
Figure 10:
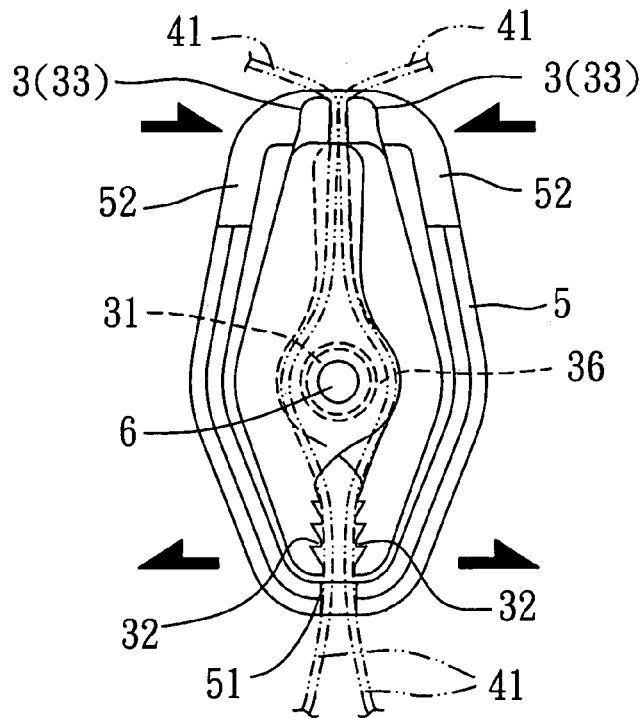
FIG. 10 is a schematic sectional view showing the transverse teeth of the retaining blocks disengaged from the two belt sections of the belt according to the present invention.

Referring to FIGS. 8 through 10, the free ends of the two belt sections 41 of the belt 4 are respectively extended out of the housing 5 in reversed directions and respectively fixedly fastened to the two ends of the handlebar 13 of the baby stroller 1. At this point the two outwardly extending belt sections 41 of the belt 4 impart a pressure to the bases 35 of the retaining blocks 3 and to turn the retaining blocks 3 about the pivot bolt 6. Thereby causing the transverse teeth 32 to engage the belt 4 firmly, and therefore the backrest adjustment structure "a" is positively held at the back side of the backrest 22, supporting the backrest 22 at the desired angle of inclination. When wishing to adjust the angle of inclination of the backrest 22, press the finger strips 33 (or keys 37) of the two retaining blocks 3 toward each other to disengage the transverse teeth 32 from the two belt sections 41 of the belt 4 (FIG. 10), and then pull the two belt sections 41 of the belt 4 relative to the retaining blocks 3 and the housing 5 to adjust the backrest 22 to the desired angle of inclination, and then release the fingers from the finger strips 33 (or keys 37).

As indicated above, the two belt sections 41 of the belt 4 are extended out of the housing 5 in reversed directions to impart a pressure to the retaining blocks 3 and to further force the transverse teeth 32 of the retaining blocks 3 against the two belt sections 41 of the belt 4, and therefore the transverse teeth 32 of the retaining blocks 3 caught the two belt sections 41 of the belt 4 firmly in position. Further, when pressing press the finger strips 33 (or keys 37) of the two retaining blocks 3 toward each other, the transverse teeth 32 of the retaining blocks 3 are disengaged from the two belt sections 41 of the belt 4, and the adjustment of the angle of inclination of the backrest 22 can be done. Because the invention eliminates the use of a spring member, the cost for component parts is greatly reduced, and the assembly process of is simplified.

Although a particular embodiment of the invention has been described in detail for purposes of illustration, various modifications and enhancements may be made without departing from the spirit and scope of the invention.

What the invention claimed is:

1. A backrest adjustment structure for a baby stroller comprising:
   a housing, said housing having a top opening and a bottom hole;
   a pivot member transversely mounted inside said housing;
   two retaining blocks respectively pivotally mounted on said pivot member at two sides inside said housing, each said retaining block comprising a base pivoted to said pivot member, said base having a top side and a bottom side, a finger strip extending from the top side of said base to the outside of said housing through the top opening of said housing, and a plurality of transverse teeth arranged in parallel at said base near the bottom side of said base; and
   a belt fastened to a handlebar of said baby stroller and adapted to support a backrest of a seat of said baby stroller in a reclined position, said belt having two belt sections arranged together and inserted through the bottom hole and top opening of said housing between said two retaining blocks, said two belt sections each having a first end connected to each other below the bottom hole of said housing and a second end extending outwards in reversed directions outside said housing and respectively fastened to two distal ends of said handlebar;
   wherein the reversely extended second ends of the two belt sections of said belt impart a pressure to turn said retaining blocks about said pivot member and to further force said retaining blocks to hold down the two belt sections of said belt with the respective transverse teeth and to secure said two belt sections of said belt to said housing; said retaining blocks are forced to disengage the respective transverse teeth from the two belt sections of said belt for enabling a user to adjust the position of housing relative to said belt when the user presses the finger strips of said retaining blocks toward each other.

2. The backrest adjustment structure for a baby stroller as claimed in claim 1, wherein said retaining blocks each have a sidewall perpendicularly extending from one lateral side of the respective base, and a barrel perpendicularly extending from said side wall and pivotally coupled to said pivot member, the barrel of each said retaining block defining with the base of the respective retaining block a gap for the passing of the two belt sections of said belt.

3. The backrest adjustment structure for a baby stroller as claimed in claim 2, wherein the base of each said retaining block has a middle part curved outwards and spaced around the respective barrel.

4. The backrest adjustment structure for a baby stroller as claimed in claim 1, wherein said housing is comprised of two symmetrical half shells that are abutted against each other.

5. The backrest adjustment structure for a baby stroller as claimed in claim 4, wherein said retaining blocks each have a fixed key extended from the respective base at an outer side adjacent to the respective finger strip; said housing has two button holes symmetrically disposed at two sides for accommodating the fixed key of said retaining blocks for enabling the user to press the fixed keys of said retaining blocks with the fingers to further turn said retaining blocks about said pivot member.

* * * * *